US006566870B2

United States Patent
Sorenson et al.

(10) Patent No.: US 6,566,870 B2
(45) Date of Patent: May 20, 2003

(54) VACUUM PLATE DISC STABILIZER FOR A SPIN-STAND TESTER USED FOR TESTING A HEAD-GIMBAL ASSEMBLY

(75) Inventors: Gary D. Sorenson, Eden Prairie, MN (US); Thomas J. Schmitt, Apple Valley, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 23 days.

(21) Appl. No.: 09/864,347

(22) Filed: May 23, 2001

(65) Prior Publication Data

US 2002/0027435 A1 Mar. 7, 2002

Related U.S. Application Data (60) Provisional application No. 60/206,869, filed on May 24, 2000.

(51) Int. Cl.[7] ............................................... G01R 33/12
(52) U.S. Cl. ...................... 324/210; 324/262; 360/99.12
(58) Field of Search ................................ 324/212, 210, 324/262, 211, 261; 360/99.05, 99.08, 99.01, 99.12, 99.04; 361/234

(56) References Cited

U.S. PATENT DOCUMENTS

| | | | |
|---|---|---|---|
| 3,980,810 A | | 9/1976 | Tinet ............................ 178/6.6 |
| 4,071,854 A | | 1/1978 | Bijon et al. ................... 358/128 |
| 4,334,302 A | | 6/1982 | Peppers ........................ 369/261 |
| 4,734,809 A | | 3/1988 | Inuma et al. ........... 360/130.34 |
| 5,589,771 A | * | 12/1996 | Chur ............................ 324/210 |
| RE35,670 E | * | 11/1997 | Immamura et al. ......... 360/103 |
| 5,872,451 A | * | 2/1999 | Guzik ......................... 324/212 |

* cited by examiner

*Primary Examiner*—Edward Lefkowitz
*Assistant Examiner*—Subhash Zaveri
(74) *Attorney, Agent, or Firm*—Westman, Champlin & Kelly (57) ABSTRACT

A disc stabilizer for use in a spin-stand tester having a spindle motor for rotating a disc is provided. The spin-stand tester is capable of positioning a transducing head adjacent a first surface of the disc. The disc stabilizer includes a vacuum plate coupled to a spindle of the spindle motor. The vacuum plate has a top surface and a bottom surface opposite the top surface. At least one of the top and the bottom surfaces is a grooved surface including multiple vacuum channels. The grooved surface is substantially in contact with a second surface of the disc. Vacuum distributed through the multiple vacuum channels of the grooved surface is applied directly to the second surface of the disc, thereby holding the disc in place.

20 Claims, 5 Drawing Sheets

VACUUM PLATE DISC STABILIZER FOR A SPIN-STAND TESTER USED FOR TESTING A HEAD-GIMBAL ASSEMBLY

CROSS-REFERENCE TO RELATED APPLICATION

This application claims priority benefits from U.S. Provisional Patent Application Serial No. 60/206,869, filed May 24, 2000 and entitled "VACUUM PLATE DISC STABILIZER FOR DYNAMIC HGA ELECTRICAL TEST".

FIELD OF THE INVENTION

The present invention is related to disc drive testing. More specifically, the present invention is related to a disc stabilizer for use in a spin-stand tester.

BACKGROUND OF THE INVENTION

In a computer disc drive, data is stored on a computer disc in concentric tracks. In many drives, the data is stored using a write head that changes a physical property of the disc. The data is read from the disc by positioning a read head over a desired track and sensing the physical properties of the disc along the track. For example, in a magnetic disc drive, the read head senses magnetic moment boundaries along the disc.

The process for producing a read head or a write head varies depending upon the type of read head or write head being produced. Nonetheless, all head manufacturing methods share common characteristics, such as high degree of manufacturing complexity, small feature sizes, and a susceptibility to manufacturing errors. Because of this, each production method generates some heads that do not meet specifications. In order to detect faulty heads accurately, the transducing heads must be tested over a disc surface. In particular, each transducing head must be flown over a disc surface while it performs writing and/or reading operations. Early in the disc drive manufacturing art, this type of testing was performed after the head was assembled in a complete disc drive. However, this in-drive testing proved to be unacceptable because the disc drive had to be rebuilt if the head was found to be faulty.

To overcome the ineffectiveness of in-drive testing, the art developed a "spin-stand" which allowed the head to be tested before it was placed in a disc drive. In general, a spin-stand includes a spinning computer disc and a mounting support that supports the head and moves the transducing head to a desired position over the spinning disc. The spin-stand allows a series of tests to be performed on the transducing head including, for example, error-rate testing, pulse width—fifty testing, track average amplitude testing and track scan testing.

Tester to tester variation and variation within a tester should be small so that properly functioning heads are not classified as "failed" and defective heads are not classified as "good". One component of tester variation is the stability of the head position over the data tracks on the disc. Several tests such as track scan and bit error rate rely on the head being at a known location with respect to a given track centerline. Test integrity is degraded if there is undesired cross-track head movement during the test.

A head-gimbal assembly (HGA) which includes a head, a suspension assembly for positioning the head, and a flexible circuit that carries electrical signals between the head and drive electronics is the first subassembly where the head can be tested under conditions similar to those in a hard disc drive. Electrical tests on HGAs, performed using conventional spin-stand testers in which the disc is clamped to a shaft of a spindle motor, have shown that heads that pass measurement at inner diameter (ID) tracks on the disc can fail when tested at outer diameter (OD) tracks. This is because the disc is only supported by the shaft at the ID. Other measurements have shown that positional relationship between a read/write head and a written data track is less stable at OD tracks on the same type tester. Because OD testing has become important for many HGA products, it is possible that good HGA assemblies will be failed because of instabilities in the tester, resulting from inadequate support at OD tracks of the disc, and not because of head performance characteristics.

The present invention addresses these problems, and offers other advantages over the prior art.

SUMMARY OF THE INVENTION

The present invention relates to a disc stabilizer for use in a spin stand tester with the disc stabilizer including a vacuum plate that supports the disc, thereby addressing the above-identified problems.

A disc stabilizer for use in a spin-stand tester having a spindle motor for rotating a disc is provided. The spin-stand tester is capable of positioning a transducing head adjacent a first surface of the disc. The disc stabilizer includes a vacuum plate coupled to a spindle of the spindle motor. The vacuum plate has a top surface and a bottom surface opposite the top surface. At least one of the top and the bottom surfaces is a grooved surface including multiple vacuum channels. The grooved surface is substantially in contact with a second surface of the disc. Vacuum distributed through the multiple vacuum channels of the grooved surface is applied directly to the second surface of the disc, thereby holding the disc in place.

These and various other features as well as advantages which characterize the present invention will be apparent upon reading of the following detailed description and review of the associated drawings.

BRIEF DESCRIPTION OF THE DRAWINGS

FIG. 5-1 shows a perspective view of an embodiment of a disc stabilizer of the present invention.

FIG. 5-2 shows a sectional view of an embodiment of the disc stabilizer of FIG. 5-1.

DETAILED DESCRIPTION OF ILLUSTRATIVE EMBODIMENTS

Figure 1:
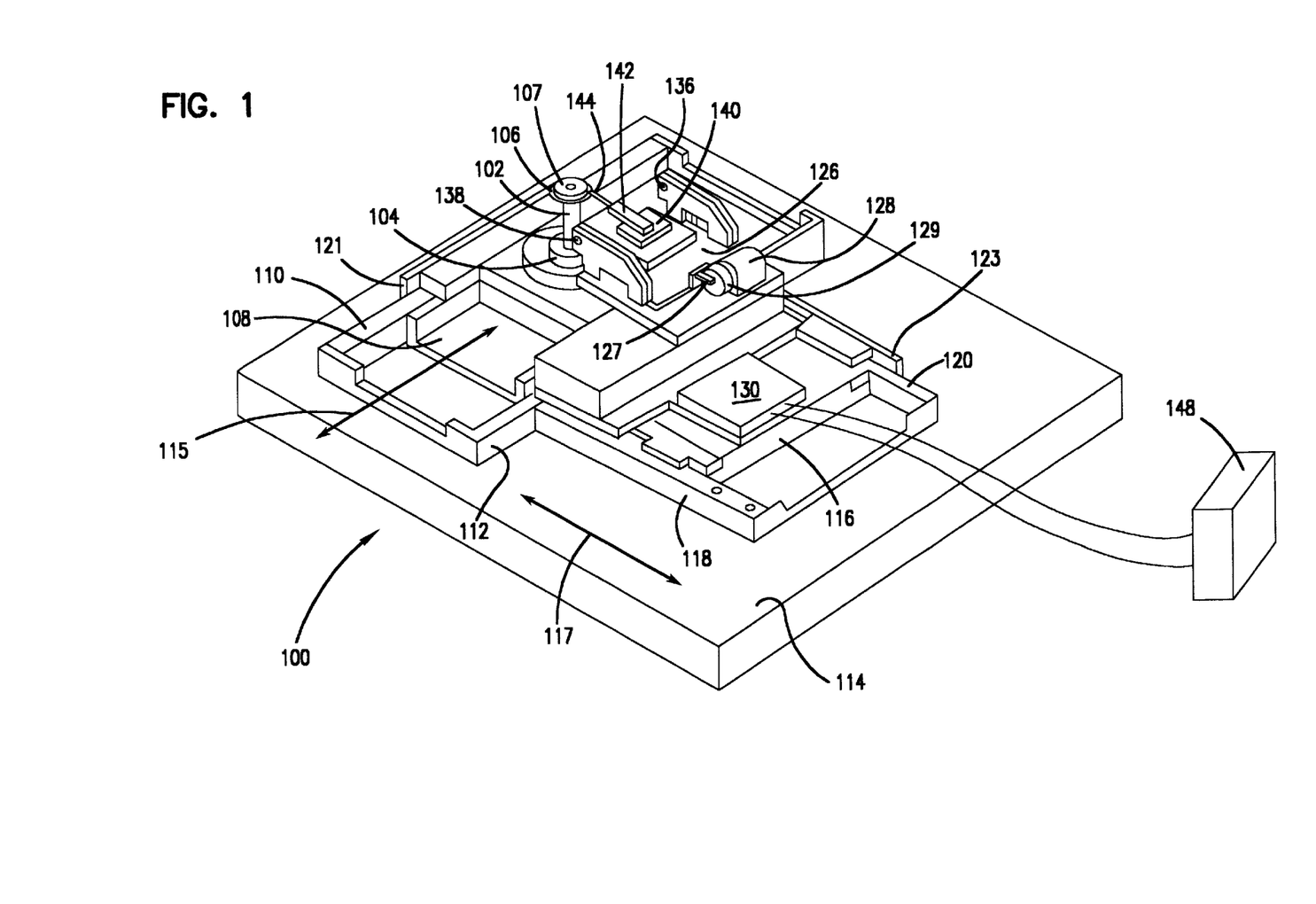
FIG. 1 is perspective view of an example of a spin-stand with which the vacuum plate disc stabilizer of the present invention is useful.

Referring now to FIG. 1, a perspective view of an example of a spin-stand 100 with which the present invention is useful is shown. Spin-stand 100 includes disc 106 mounted on spindle 102, which is rotated by spindle motor 104. Disc stabilizer 107 of the present invention is shown supporting disc 106. Disc stabilizer 107 supports disc 106 towards its OD where the effects of disc vibration are most pronounced. Details of modes of vibration in a disc and how a disc stabilizer supports the disc are included further below.

In spin stand 100, spindle motor 104 rests on platform 108 which moves between guide rails 110 and 112. Platform 108 can be supported by a cushion of air during movement and can be stabilized in a particular position by the application of a vacuum between platform 108 and granite base 114 located directly below platform 108. For purposes of reference, movement of platform 108 along guides 110 and 112 is considered to be in the "X" direction as shown by arrows 115. A position encoder 121 can be located, for example, along guide 110 to provide an indication of the position of platform 108.

Spin-stand 100 also includes a carriage 116 that moves between rails 118 and 120 in the "Y" direction as indicted by arrows 117. Similar to platform 108, carriage 116 can be supported by a cushion of air during movement and can be locked into position by applying a vacuum between carriage 116 and granite base 114. A position encoder 123 can be located, for example, along guide 120 to provide an indication of the position of platform 116.

Carriage 116 and platform 108 both move using electric motors mounted between one of the guide rails and the respective platform or carriage. Other types of motors, such as a Stepper motor, may be used in place of the electric motors. These motors generally perform coarse adjustment of head suspension 144 which is connected to a suspension chuck 142. Suspension chuck 142 is mounted to piezo platform 140. Piezo platform 140 is connected to suspension chuck 142 through piezo elements that are able to move suspension 142 in the X direction to perform fine adjustment of a transducing head, held by suspension 144, with respect to disc 106.

During head loading operations, pivot motor 128 rotates eccentric cam 129 causing lever arm 127 and the back end of pivoting platform 126 to rotate upward about pivot pins 138 and 136. Suspension chuck 142, which carries suspension 144, is then placed on piezo platform 140 and spindle motor 104 is activated so that disc 106 rotates at a desired speed. Carriage 116 can be moved forward so that a head at the end of suspension 144 moves under the spinning disc 106. Support platform 108 is also moved so that the head is positioned at a desired radius along disc 106. When the head nears the desired location relative to disc 106, motor 128 rotates eccentric cam 129 back so that pivoting platform 126 returns to its level position and the head is brought into proximity with disc 106. The head on suspension 144 then flies over a bottom surface of disc 106. The top surface of disc 106 is in contact with disc stabilizer 107.

The head on suspension 144 is connected by electrical leads to printed circuit 130, which has further connections to control box 148. Control box 148 controls the positioning of the head on suspension 144 and the types of tests that are performed on the head. In particular, control box 148 designates the location for the test track, the data to be written to the disc, and the position of the read head within the written track during read back of the test data. Using the piezo elements of piezo platform 140, the read head can be moved to a number of different locations within a track during read back, so that a profile of the read head can be determined.

Figure 2:
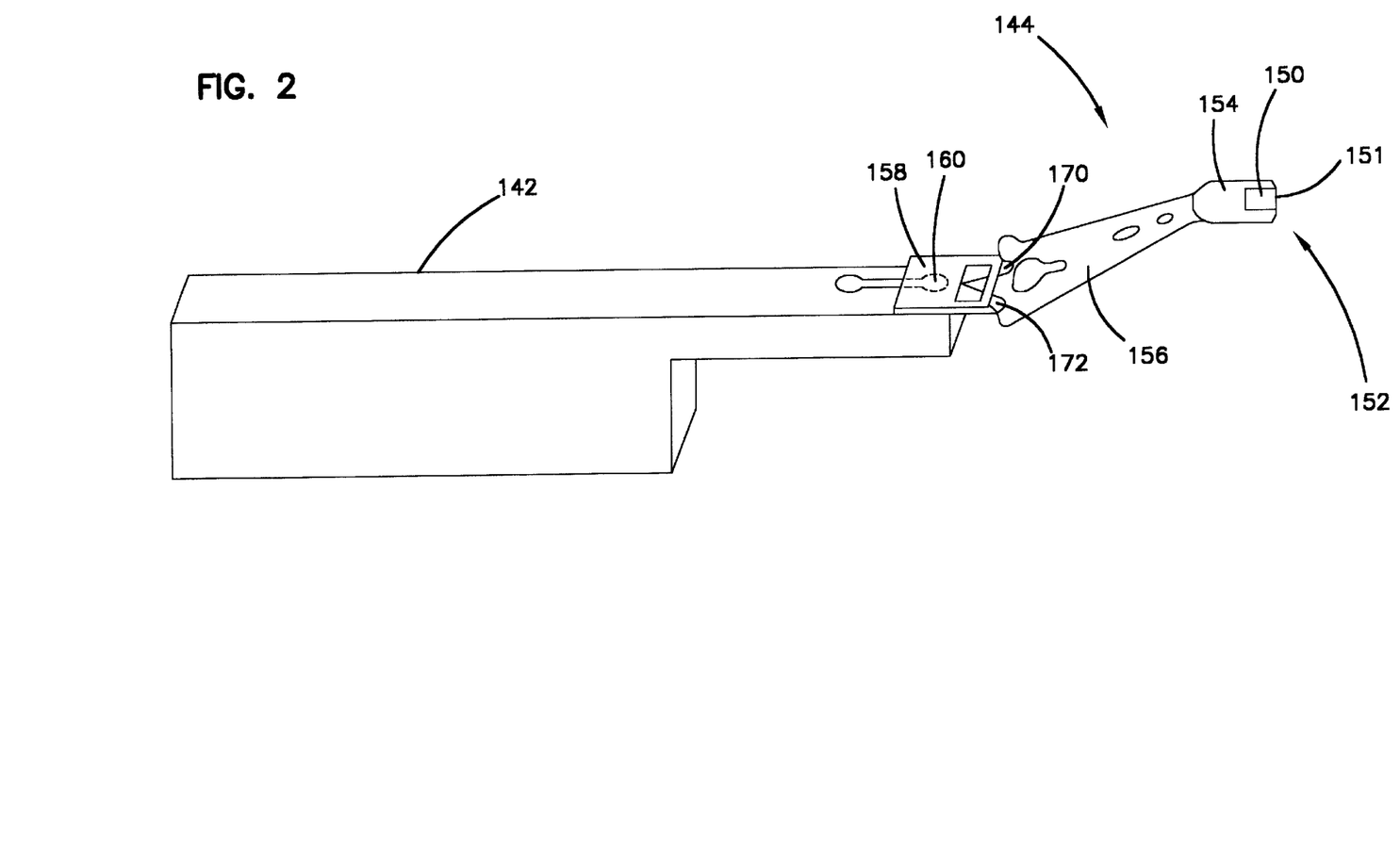
FIG. 2 is a perspective view of a suspension chuck and a head suspension assembly or HGA.

With each new generation of disc drives, the density of tracks on the disc has increased causing a corresponding decrease in the width of the read and write heads. Because of this, positioning a head within a track using the above-described methods on a spin-stand, such as spin-stand 100, has become increasingly difficult. For better track positioning, head suspension 144 of spin-stand 100 can include a positioning system that uses, for example, microactuators 170 and 172 for performing track following, as shown in the more detailed perspective view of suspension chuck 142 and suspension 144 in FIG. 2. Suspension 144 includes gimbal 154 that is connected to slider 150 containing transducing head 151 on a trailing edge 152. Suspension 144 also includes a flexure arm 156 and a base plate 158 which connects to suspension chuck 142 using boss 160. Microactuators 170 and 172 are mounted to flexure arm 156 and are capable of contracting or expanding to arcuately move head 151 over a surface of disc 106. Other configurations are possible for head suspension 144 which can provide the desired track following capability.

Disc stabilizer 107 of the present invention can be a fixed component of spin-stand 100 or an add-on component that can be installed on an existing spin-stand 100. Disc stabilizer 107 stabilizes the positional relationship between read/write head 151 and tracks of the disc, such that positional stability is essentially the same at inner and OD tracks of the disc.

Prior art spin-stand testers only employ a clamp without a disc stabilizer to hold the disc in position on the spindle. Consequently, when a test on a head is performed using a prior art spin-stand tester, test integrity may be degraded due to undesired cross-track head movement during the test. Determination of the head position relative to the data tracks in spin-stand tester and problems associated with instability in a spin-stand tester without disc stabilizer 107 are described below.

Figure 3:
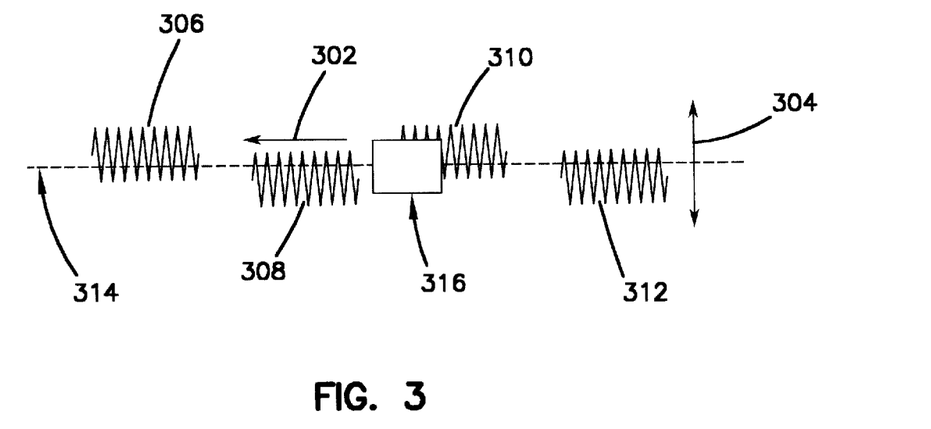
FIG. 3 shows an example of writing alternating bursts of a specific frequency on either side of a track to determine positional error signals.

Position Error Signal (PES) is a common metric of the head position relative to a data track. One method for finding PES is to use the head to write alternating bursts of a specified frequency signal on either side of a track. FIG. 3 shows an example of alternating bursts that are written and read from a track of a disc with direction of disc rotation 302 and cross-track motion 304. A-bursts 306 and 310 are written on a first side of track centerline 314 and B-bursts 308 and 312 are written on a second side of track centerline 314. After the bursts are written, head 316 is positioned over track centerline 314 and allowed to read back the bursts. The head position is found by comparing the amplitude of the read back signal from pairs of A/B bursts. PES is determined using EQ. 1 below.

$$PES = \frac{A-B}{A+B}K \qquad \text{EQ. 1}$$

K is a constant that relates the A/B burst amplitudes to a physical displacement of the head from the track centerline. Each pair of A/B bursts will produce a new value for PES. If the head position is stable, it will stay on the track centerline and the PES will be zero (the A amplitudes and B amplitudes will be equal).

In general, a tester will have mechanical instabilities and the PES will not be zero. The spindle motor alone will have repeatable and non-repeatable run out that will cause the disc to move with respect to the head. Typically, these mechanical instabilities are present when the A and B bursts are being written so the burst positions with respect to the track center will vary. Even if the head were perfectly stationary when reading back the bursts, the PES would not be zero.

After several revolutions of PES values have been collected, statistics can be used separate out the different components of PES. The PES can be broken down into repeatable run out (RRO) and non-repeatable run out (NRRO).

$$PES = RRO + NRRO \qquad \text{EQ. 2}$$

RRO is calculated by averaging the PES for each burst pair over many revolutions. The averaging removes most of the non-repeatable mechanical along with any electrical noise present in the signal. All repeatable motion between the head and disc tracks is not detectable with the PES algorithm so the RRO represents the non-repeatable mechanical error of the written in burst pattern. NRRO is calculated by subtracting RRO from the PES as indicate by EQ. 2 above. NRRO is made up of the non-repeatable motion between the head and disc during the read back plus electrical noise present in the PES measurement signal.

The standard deviation of NRRO ($\sigma_{NRRO}$) is used to characterize the stability of a tester. A tester with large $\sigma_{NRRO}$ is not as stable as another tester with small $\sigma_{NRRO}$. NRRO standard deviations are generally stated in nanometers (nm) or microinches ($\mu$in). A criteria for tester stability is that $\sigma_{NRRO}$ be equal to or less than 1% of the track pitch for a given HGA design. Because of this, tester capability can be stated in terms of tracks-per-inch (TPI) capability by using the following equation:

$$TPI_{CAPABILITY} = \frac{0.01}{\sigma_{NRRO}} \qquad \text{EQ. 3}$$

As discussed above, electrical testing on HGA products has shown that heads that pass measurement at ID tracks on a disc can fail when tested at OD tracks. PES measurements have also shown that $\sigma_{NRRO}$ is typically higher at OD tracks than at ID tracks. Because OD testing has become important for higher TPI products, it is possible that good heads will be "failed" because of instabilities in the tester and not because of head performance characteristics.

One reason for less stability at the OD of the disc is disc flutter. The disc has natural modes of vibration. If these modes get excited, the disc begins to vibrate. The motion is most severe at the OD of the disc where it is not supported.

Figure 4:
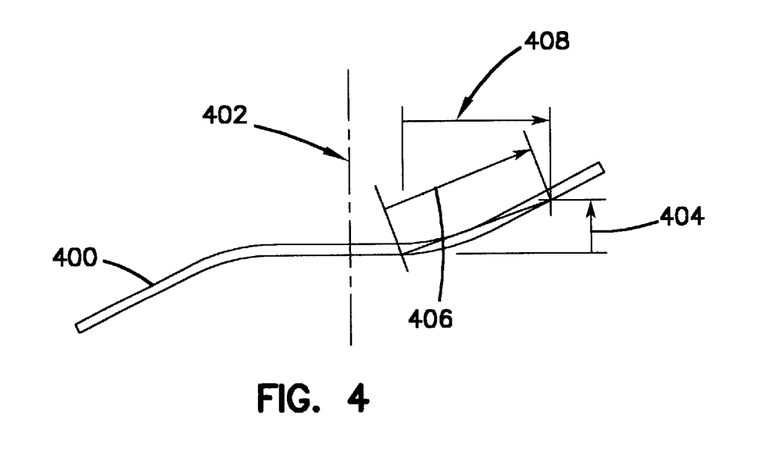
FIG. 4 illustrates deflection in a disc due to vibration.

Referring now to FIG. 4, an example of deflection in a disc due to vibration or flutter is shown. Flutter can be excited by changing air pressure on the disc (windage), instabilities in the air bearing, or by the moving pressure of the head.

Disc flutter can cause the head to move relative to the disc in two ways. The first is due to a cosine error. This is shown in FIG. 4. As disc 400, having a having an axis of rotation 402, moves in the axial direction, the head will move side to side with respect to a track according to the equation, $$x \approx \sqrt{r^2 - A^2 \sin^2(\omega_f t)} - r \qquad \text{EQ. 4}$$

where $A \sin(\omega_f t)$ is the axial flutter motion 404 at $\omega_f$, the flutter frequency and r is the disc radius 406. The radius (r) plus head motion (x) is shown as horizontal component (r+x) 408. If the flutter frequency is not a harmonic of the spinning frequency, the x motion will show up as NRRO. The magnitude of x motion is highest at the OD of disc 400.

The second way flutter can move the head is by fanning air against the HGA. This oscillating wind occurs at the flutter frequency. Again, the effects of this windage are more pronounced at the OD of the disc where the air flow is highest.

Figure 51:
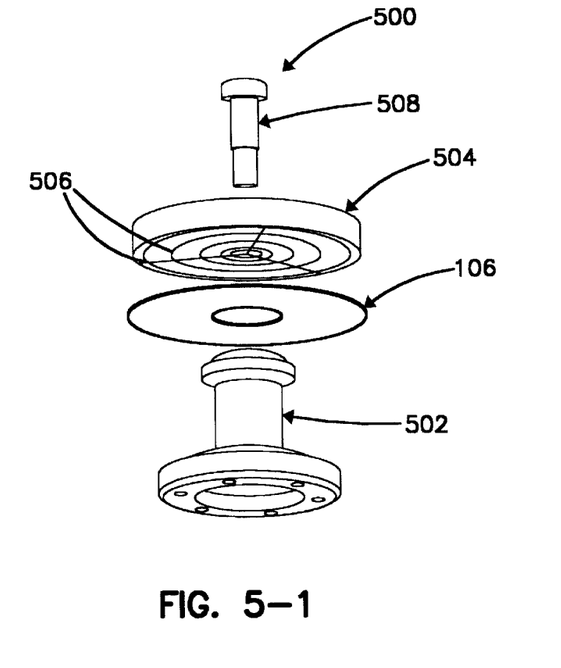

Referring now to FIG. 5-1, a perspective view of an embodiment of a disc stabilizer 500 of the present invention is shown. Stabilizer 500 can be used to stabilize disc 106 of tester 100 (shown in FIG. 1) while disc 106 is spinning. Disc stabilizer 500 includes a spindle adapter 502 that can be mounted to the top of air bearing spindle 102 (shown in FIG. 1), a vacuum plate 504 with vacuum channels 506 that attaches to spindle adapter 502, and a screw 508 that holds spindle adapter 502 and vacuum plate 504 together.

Figure 52:
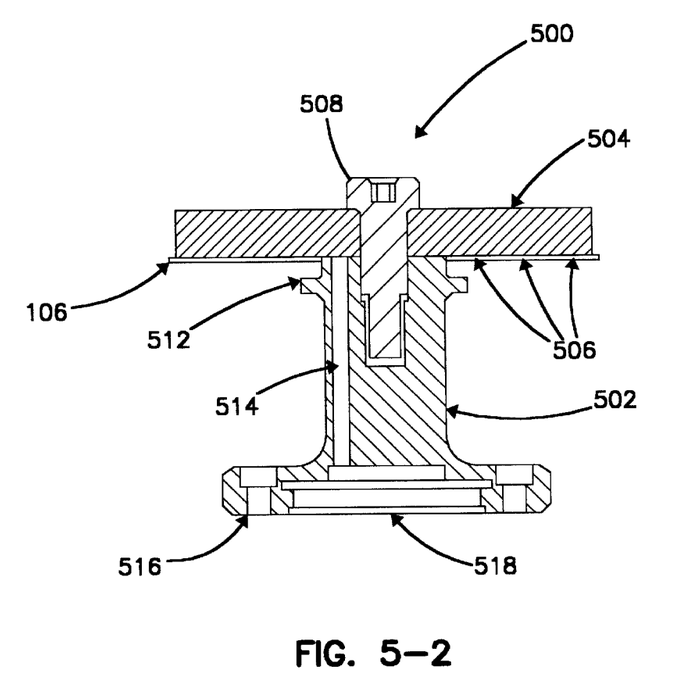

Referring now to FIG. 5-2, a sectional view of an embodiment of disc stabilizer 500 is shown. Vacuum is supplied to vacuum plate 504 from channels in air bearing 518 through ports (such as port 514) in spindle adapter 502. Vacuum channels 506 (shown in FIG. 5-1) include four concentric circular grooves 506 cut in the bottom surface of vacuum plate 504. The inner most groove is located over the vacuum ports in the spindle adapter (only one of multiple ports (port 514) is seen in the section view in FIG. 5-2). This configuration allows the vacuum plate to be installed in any angular orientation over the vacuum ports in the spindle adapter. Vacuum channels 506 also include three radial grooves that connect the circular grooves and serve to distribute vacuum from the inner circle to the three outer circles. When disc 106 is placed against the grooved surface the vacuum is applied directly to the disc and will hold it in place at both the ID and the OD, to thereby overcome problems with instability at the disc OD demonstrated by prior art systems.

Grooves 506 with a width of, for example, 1 mm were found to be suitable for manufacture of plate 504 without causing significant local deformation of disc 106 directly over grooves 506 due to vacuum. The working surface area of grooves 506 with a width of 1 mm is about 0.89 in². Employing a vacuum level 650 mmHg in tester 100 (of FIG. 1) provides a holding force on disc 106 of about 11 lbs. If disc 106 warps slightly away from vacuum channels or grooves 506, then more surface area is exposed to vacuum and more force is available to pull disc 106 back in contact with plate 504. Because disc 106 is forced to conform to the surface of vacuum plate 504, the variation in surface motion from disc to disc is minimized.

Vacuum plate 504 stabilizes disc 106 at the OD by providing a rigid surface for disc 106 to reference against. Vacuum plate 504 made from, for example, aluminum with a thickness of, for example, about 0.375" has been found to be suitable for stabilizing the OD of the disc. A diameter of, for example, 81 mm for vacuum plate 504 has been found to be adequate for supporting media discs with diameters of 95 mm and 85 mm.

The above dimensions of vacuum plate 504 and grooves 506 are illustrative only, and changes may be made to these dimensions without departing from the scope and spirit of the present invention. Also, various materials other than aluminum may be used for adapter 502, vacuum plate 504 and screw 508.

In addition to stabilizing disc 106 at its OD, vacuum plate 504 also provides a larger thermal volume for disc 106 to be in contact with, thereby contributing to the thermal stability of disc 106 while under test.

In the embodiment of disc stabilizer 500 shown in FIGS. 5-1 and 5-2, disc 106 references against a bottom surface of vacuum plate 504 and electrical testing is performed with the head flying over a bottom surface of disc 106. Since the test surface and the reference surface are different, there is an additional tolerance build up in the device equal to the tolerance of the disc thickness. This can be modified by machining flange 512 higher on spindle adapter 502 so that it becomes the reference surface disc 106 rests against. In this way, the test surface and the reference surface are identical. The above embodiments can be installed on a spin-stand tester without further modification other than supplying vacuum to the center channels of the air bearing.

Figure 6:
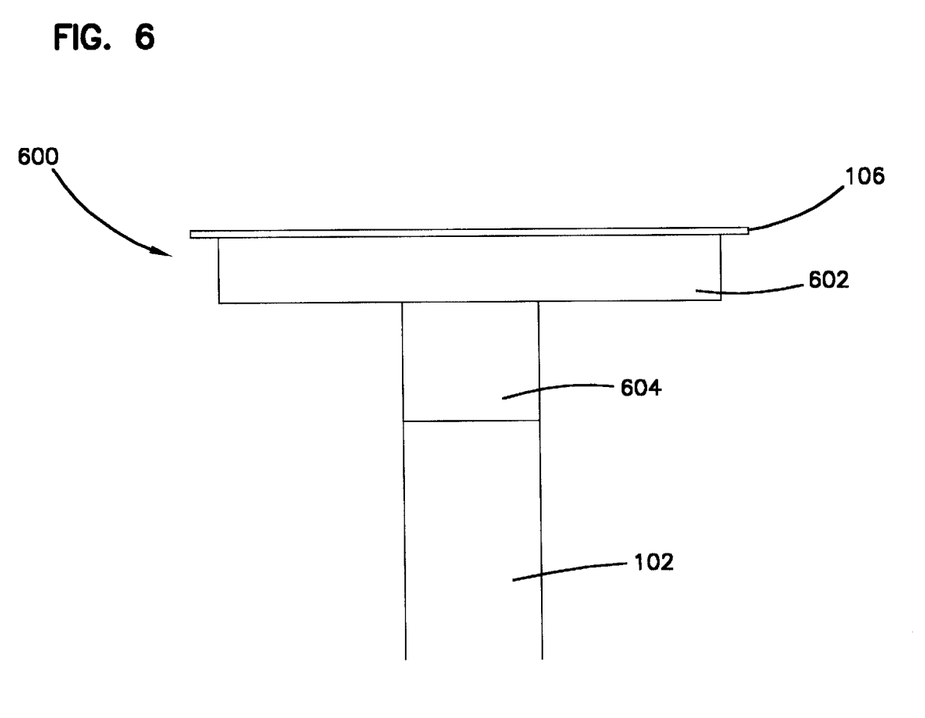
FIG. 6 shows a block diagram of another embodiment of a disc stabilizer in accordance with the present invention.

Referring now to FIG. 6, a block diagram of an embodiment of disc stabilizer 600 with the test surface of disc 106 being the top surface is shown (vacuum plate 504 of FIGS. 5-1 and 5-2 turned upside down). Disc stabilizer 600 includes vacuum plate 602 having a top surface with vacuum channels (vacuum channels not shown in FIGS. 6-1 and 6-2) and a spindle adapter 604 that couples vacuum plate 602 to spindle 102. Spindle 102 and adapter 604 are configured to supply vacuum to the top surface of plate 602. Disc 106 is substantially in contact with the top surface of vacuum plate 602. Disc stabilizer 600 can be further simplified to combine vacuum plate 602 and spindle adapter 604 into one part or to make vacuum plate 602 a part of spindle 102. Simplification results in fewer parts and allows the spindle adapter to be made shorter to reduce the spinning mass. Balancing features can be added to vacuum plate 602 so that it can be dynamically balanced on the spindle.

An analysis and comparison of modal frequencies of a clamped disc without a disc stabilizer and a clamped disc with a vacuum plate disc stabilizer in accordance with the present invention is provided below.

Modal analysis of a clamped disc (without a disc stabilizer) using a finite element method shows that a disc has natural resonance modes starting at about 670 Hz. Table 1 below lists approximate natural mode frequencies ($f_n$) of an exemplary 95 mm diameter disc clamped at the ID. When the disc is spinning, the centripetal forces effectively stiffen the disc. The stiffened frequencies are also shown in Table 1. As discussed above, these modes of vibration can be excited by many external events.

TABLE 1

| Mode Number | Number of Nodal Diameters | $f_n$, not spinning (Hz) | $f_n$, 7,200 RPM (Hz) | $f_n$, 10,000 RPM (Hz) |
| --- | --- | --- | --- | --- |
| 1 | 0 | 672 | 687 | 700 |
| 2 | 1 | 667 | 684 | 700 |
| 3 | 2 | 776 | 798 | 818 |
| 4 | 3 | 1200 | 1220 | 1240 |
| 5 | 4 | 1940 | 1960 | 1970 |

Modal analysis of a clamped vacuum plate in accordance with the present invention shows that the natural frequencies are much higher. Table 2 below lists approximate natural mode frequencies of a 3.2" diameter vacuum plate clamped at the ID. The effect of spin stiffening at 10,000 RPM is also shown in Table 2.

TABLE 2

| Mode Number | Number of nodal Diameters | $f_n$, not spinning (Hz) | $F_n$, 10,000 RPM (Hz) |
| --- | --- | --- | --- |
| 1 | 0 | 9720 | 9790 |
| 2 | 1 | 8900 | 8990 |
| 3 | 2 | 10400 | 10500 |
| 4 | 0 | 12200 | 12200 |
| 5 | 3 | 16700 | 16800 |

For mode number 4 in Table 2 above, the number of nodal diameters is 0 because the disc is expanding and contracting in diameter in the plane of the disc.

Vibration theory can be used to understand the differences in Tables 1 and 2 by considering the fundamental resonant frequency. The first natural resonance of a system is approximated by EQ. 5 below.

$$\omega_n = \sqrt{\frac{k_{eq}}{m_{eq}}} \qquad \text{EQ. 5}$$

where $\omega_n$ is the natural frequency, $k_{eq}$ is an equivalent stiffness, and $m_{eq}$ is an equivalent mass. The vacuum plate is about ten times thicker than the disc so it has about ten times the mass. From mechanics, the bending stiffness of a plate is proportional to the cube of the thickness. Thus, the fundamental resonant frequency of the vacuum plate can be estimated from the disc natural frequency as approximated by EQ. 6 below.

$$\omega_{vacuum\ plate} \approx \sqrt{\frac{10^3 k_{disc}}{10\, m_{disc}}} = 10 \omega_{disc} \qquad \text{EQ. 6}$$

The increase in stiffness of the vacuum plate produces a stable surface for the media disc to reference against.

Tests performed with the vacuum plate disc stabilizer in accordance with the present invention have verified that the PES NRRO is significantly reduced at the OD for 85 mm and 95 m discs. Table 3 below lists TPI capability of a spin-stand tester with and without the vacuum plate. The data in Table 3 is for a 95 mm disc spinning at 10,000 RPM. Tester capability is calculated from NRRO using EQ. 3 provided above.

TABLE 3

| TPI Capability | Baseline Spindle Adapter | Vacuum Plate Spindle Adapter |
| --- | --- | --- |
| ID (r = 0.799 inches) | 35,100 | 35,400 |
| OD (r = 1.482 inches) | 25,900 | 35,000 |

The data shows that the vacuum plate improves the tester capability at the OD. The improvement is about 35%. This shows that the vacuum plate is capable of supporting and stabilizing the disc at the OD to the same level of stability as at the ID, where the disc is stabilized at the clamping surface.

Further, testing of an 85 mm disc at 15,000 RPM has shown as much as a 40% improvement in $\sigma_{NRRO}$ at OD due to the vacuum plate device.

The above tests performed on 95 mm and 85 mm discs are only illustrative examples of how the disc stabilizer of the present invention provides stability at the OD of a disc. Discs of different dimensions may be used without departing from the scope and spirit of the invention.

In summary, a disc stabilizer (such as 107, 500, 600) for use with a spin-stand tester (such as 100) having a spindle motor (such as 104) for rotating a disc (such as 106) is provided. The tester (such as 100) positions a transducing head (such as 151) adjacent a first surface of the disc (such as 106). The disc stabilizer (such as 107, 500, 600) includes a vacuum plate (such as 504, 602) coupled to a top end of a spindle (such as 102) of the spindle motor (such as 104). The vacuum plate (such as 504, 602) includes a top surface and a bottom surface opposite the top surface. At least one of the top surface and the bottom surface is a grooved surface including a plurality of vacuum channels (such as 506). The grooved surface is substantially in contact with a second surface of the disc (such as 106) in a manner that vacuum distributed through the plurality of vacuum channels (such as 506) is applied directly to the second surface of the disc (106), to hold the disc (such as 106) in place.

A method of stabilizing a disc (such as 106) in a spin-stand tester (such as 100) having a spindle motor (such as 104) for rotating a disc (such as 106) is provided. The tester (such as 100) positions a transducing head (such as 151) adjacent a first surface of the disc (such as 106). The method includes providing a vacuum plate (such as 504, 602) having a grooved surface including a plurality of vacuum channels (such as 506). The vacuum plate (such as 504, 602) couples to the spindle motor (such as 104). The method further includes positioning a second surface of the disc (such as 106) adjacent the grooved surface of the vacuum plate (such as 504, 602). The grooved surface is substantially in contact with the second surface of the disc (such as 106), such that vacuum distributed through the plurality of vacuum channels (such as 506) is applied directly to the second surface of the disc (such as 106), thereby holding the disc (such as 106) in place.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the spin-stand tester while maintaining substantially the same functionality without departing from the scope and spirit of the present invention. In addition, although the preferred embodiment described herein is directed to a disc stabilizer for a spin-stand tester, it will be appreciated by those skilled in the art that the teachings of the present invention can be applied to other systems that employ spinning discs, without departing from the scope and spirit of the present invention.

What is claimed is:

1. A disc stabilizer for use with a spin-stand tester having a spindle motor for rotating a disc having a first surface and a second surface, the tester adapted to position a transducing head adjacent the first surface of the disc, the disc stabilizer comprising:

a vacuum plate coupled to a top end of a spindle of the spindle motor, the vacuum plate comprising:
   a top surface; and
   a bottom surface opposite the top surface,
   wherein at least one of the top surface and the bottom surface is a grooved surface including a vacuum channel, and wherein the grooved surface is adapted for substantial contact with the second surface of the disc, such that vacuum distributed through the vacuum channel is applied directly to the second surface of the disc, to thereby hold the disc in place.

2. The apparatus of claim 1 wherein the bottom surface of the vacuum plate is a grooved surface and the second surface of the disc is adapted for substantial contact with the bottom surface of the vacuum plate.

3. The apparatus of claim 1 wherein the top surface of the vacuum plate is a grooved surface and the second surface of the disc is adapted for substantial contact with the top surface of the vacuum plate.

4. The apparatus of claim 1 wherein the vacuum plate includes balancing features to dynamically balance the vacuum plate on the spindle.

5. The apparatus of claim 1 wherein the grooved surface includes a plurality of vacuum channels.

6. The apparatus of claim 5 wherein the plurality of vacuum channels of the grooved surface are interconnected, such that vacuum may be distributed to the plurality of vacuum channels by supplying vacuum to any one of the plurality of vacuum channels.

7. The apparatus of claim 5 wherein the plurality of vacuum channels of the grooved surface comprises:
   a first plurality of concentric circular grooves; and
   a second plurality of radial grooves interconnecting the concentric grooves.

8. The apparatus of claim 1 wherein the disc stabilizer further comprises a spindle adapter having a top end and a bottom end, and wherein the top end of the spindle adapter adapted for coupling to the vacuum plate and the bottom end of the spindle adapter adapted for coupling to the top end of the spindle of the spindle motor.

9. The apparatus of claim 8 wherein the vacuum plate is coupled to the spindle adapter by a connection device.

10. The apparatus of claim 9 wherein the connection device is a screw.

11. The apparatus of claim 8 wherein the grooved surface includes a plurality of vacuum channels, and wherein the spindle adapter includes at least one vacuum port, and wherein the at least one vacuum port is in communication with at least one of the plurality of vacuum channels, and wherein the plurality of vacuum channels are interconnected, such that vacuum is distributed to the plurality of vacuum channels by supplying vacuum to at least one of the plurality of vacuum channels from the at least one vacuum port.

12. The apparatus of claim 8 wherein the top end of the spindle adapter includes a flange.

13. The apparatus of claim 8 wherein the top surface of the vacuum plate is a grooved surface and the second surface of the disc adapted for substantial contact with the top surface of the vacuum plate.

14. The apparatus of claim 13 wherein the vacuum plate and the spindle adapter are molded as a single unit.

15. The apparatus of claim 8 wherein the disc is positioned between the bottom surface of the vacuum plate and the top end of the spindle adapter, and wherein the bottom surface of the vacuum plate is a grooved surface and the second surface of the disc is adapted for substantial contact with the bottom surface of the vacuum plate.

16. The apparatus of claim 15 wherein the top end of the spindle adapter includes a flange, and wherein the flange is adapted for substantial contact with the first surface of the disc, such that a flange surface is a reference surface for the disc.

17. A method of stabilizing a disc in a spin-stand tester having a spindle motor for rotating a disc having a first surface and a second surface, the tester adapted to position a transducing head adjacent the first surface of the disc, the method comprising:

(a) providing a vacuum plate having a grooved surface including a vacuum channel, wherein the vacuum plate is adapted to couple to the spindle motor; and (b) positioning a second surface of the disc adjacent the grooved surface of the vacuum plate, wherein the grooved surface is adapted for substantial contact with the second surface of the disc, such that vacuum distributed through the vacuum channel is applied directly to the second surface of the disc, thereby holding the disc in place.

18. The apparatus of claim 17 wherein the grooved surface includes a plurality of vacuum channels.

19. The method of claim 17 wherein the plurality of vacuum channels are interconnected, such that vacuum is distributed to the plurality of vacuum channels by supplying vacuum to any one of the plurality of vacuum channels.

20. A spin-stand for testing a head and a disc outside of a disc drive comprising:
 a disc capable of spinning; and
 means for stabilizing the disc.

* * * * *

UNITED STATES PATENT AND TRADEMARK OFFICE
CERTIFICATE OF CORRECTION

PATENT NO.      : 6,566,870 B2
DATED           : May 20, 2003
INVENTOR(S)     : Gary D. Sorenson and Thomas J. Schmitt It is certified that error appears in the above-identified patent and that said Letters Patent is hereby corrected as shown below:

<u>Column 5,</u>
Line 53, Equation 4, change  " $x \approx \sqrt{r^{2-A^2\sin^2(wft)}} - r$ "   to $$-- x \approx \sqrt{r^2 - A^2 \sin^2(\omega_f t)} - r --.$$

Signed and Sealed this

Second Day of September, 2003

JAMES E. ROGAN
*Director of the United States Patent and Trademark Office*